F. A. SWAN.
COUPLING FOR FISH TAPES.
APPLICATION FILED FEB. 19, 1909.
938,723.
Patented Nov. 2, 1909.
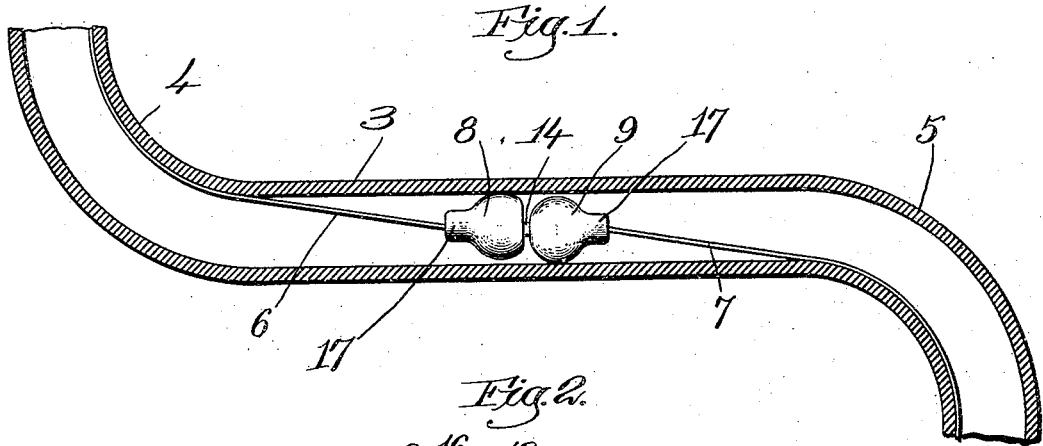
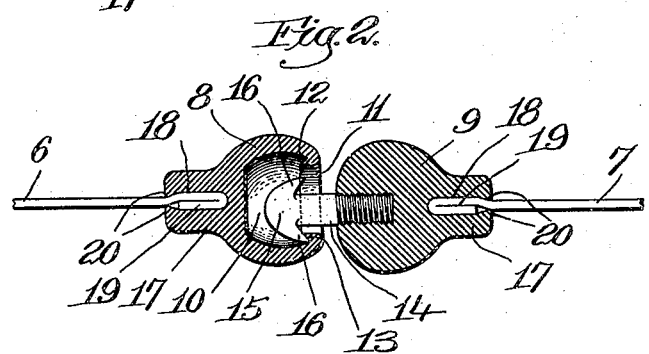
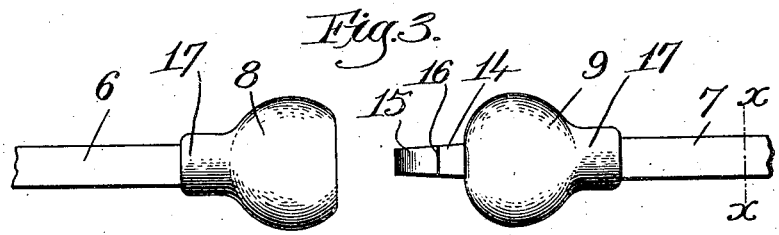
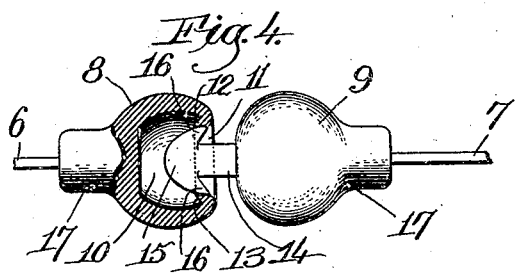
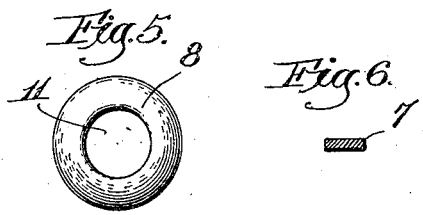
Witnesses.
Thomas Drummond.
Joseph M. Ward.
Inventor.
Frederick A. Swan,
By Wesley Gregory, Atty's.

UNITED STATES PATENT OFFICE.

FREDERICK A. SWAN, OF CLIFTONDALE, MASSACHUSETTS.

COUPLING FOR FISH-TAPES.

938,723.  Specification of Letters Patent.  Patented Nov. 2, 1909.

Application filed February 19, 1909. Serial No. 478,800.

*To all whom it may concern:*

Be it known that I, FREDERICK A. SWAN, a citizen of the United States, residing at Cliftondale, county of Essex, and State of Massachusetts, have invented an Improvement in Couplings for Fish-Tapes, of which the following description, in connection with the accompanying drawing, is a specification, like numerals on the drawing representing like parts.

In wiring up a building for electric lights or similar purposes, it is necessary to draw the wires into conduits which are placed in the walls and floors of the building. This operation is known to the trade as "fishing", and in carrying it out it is customary to use what is commonly known as fish tapes. These fish tapes are long strips of flexible ribbon-like metal which can be pushed into the conduit at one outlet and which are stiff enough so that they will follow around the elbows of the conduit until they emerge from the conduit at another outlet. The wires to be drawn into the conduit are then attached to one end of the fish tape and are drawn through the conduit thereby. Under ordinary circumstances it is comparatively easy to force the fish tape around about four elbows in the conduit, but if the construction of the building is such that there will be more than four elbows between any two outlets, it is sometimes a rather difficult matter to draw the wires into such a conduit.

The object of the invention is to provide a novel coupling by which two fish tapes that are inserted into the same conduit from opposite ends thereof will be automatically coupled together when the ends thereof meet within the conduit so that where the conduit is extremely tortuous or is long, a fish tape will be inserted at each end thereof and the two fish tapes coupled together automatically thereby permitting a wire to be drawn into the conduit.

I will first describe one embodiment of my invention and then point out the novel features thereof in the appended claims.

Referring to the drawings, Figure 1 shows a section of a conduit with two sections of fish tapes therein coupled together; Fig. 2 is an enlarged view of my improved coupling showing both of the coupling members in section; Fig. 3 is a view of the coupling members separated from each other and taken at right angles to that shown in Fig. 2; Fig. 4 is a view showing the manner in which the head of one coupling member enters the other member; Fig. 5 is an end view of the female member of the coupling; Fig. 6 is a cross section through the fish tape on the line $x$—$x$, Fig. 3.

In the drawings 3 designates a conduit having the two elbows 4 and 5, and into which an electric wire or wires are to be drawn.

6 and 7 represent two sections of fish tape such as are commonly used for drawing wires into conduits. These fish tapes are made of ribbon-like metal which is sufficiently flexible so as to permit the fish tape to pass around the elbows of the conduit.

My improved coupling is so constructed that the two members thereof will be automatically coupled merely by a relative movement toward each other, and when they are so coupled they will remain coupled while being drawn through the conduit and around the elbows therein.

The coupling comprises a female member 8 and a male member 9. The female member is made with the cavity 10 and with the opening or throat 11 leading thereto, said opening being formed in the end of the member. The opening terminates in a lip or flange 12 which is directed inwardly and which is formed with the exterior inclined surface 13. The male member 9 is provided with the extension 14 having the head 15, and the head has a shape somewhat like that of an arrow head, that is, it is provided with the two rearwardly-directed arms 16. The head is of substantially the same width as the diameter of the throat or opening 11, and the head has a pointed or rounding end. The body of each of the coupling members has an approximately spherical shape and is of a diameter nearly equal to the interior diameter of the conduit 3.

In using the fish tape, each section 6 and 7 is inserted into the end of the conduit, and as the coupling members come together, the head 15 will enter the throat 11, as shown in Fig. 4. Since the diameters of the two members 8 and 9 are only slightly less than that of the conduit 3, it will be apparent that when the two members approach each other, the head 15 will be invariably directed into the throat 11. Since the distance between the tips of the arms 16 of the head is substantially the same as the diameter of the throat or opening 11, it will be apparent that after the head 15 has entered the cavity 10, the two coupling members cannot be separated unless they have exactly the right position relative to each other, and are in exact axial alinement with each other. This is a condition which very seldom arises, for as soon as the two members are coupled, as shown in Fig. 2, there will invariably be a slight lateral movement of one member relative to the other sufficient to cause one of the arms 16 to engage with the lip or flange 12. After the two parts have been coupled, as shown in Fig. 2, the fish tape may be drawn in either direction without danger of the coupling becoming uncoupled.

It will be noted that the arms 16 extend in a direction at right angles to the width of the tape 7, and this arrangement is adopted in order to prevent the coupling from becoming uncoupled while it is passing around an elbow. In passing around an elbow, the tape will, of course, always bend in a direction at right angles to the width thereof, or, in other words, in a direction parallel to the plane of the arm 16, and any turning movement of the two coupling members in this direction will not cause the arms 16 to be disengaged from the lip or flange 12. The rounded shape of the head 15 permits it to enter the opening 11 readily, and even if the two members are considerably out of line with each other yet the head will be directed into and through the opening 11 because of its rounded shape.

The two coupling members 8 and 9 may be secured to the tape sections 6 and 7 in any approved way. I have, however, herein shown each coupling member as having the neck 17 which is provided with an axial bore or recess 18. The end of the fish tape is doubled on itself as at 19 and is entered into the recess 18 and thereafter the end of the neck is swaged or staked over, as at 20, thereby locking the folded end 19 of the fish tape, which constitutes a head, into the neck.

The constructional details of the device may be varied in many ways without departing from the invention.

Having fully described my invention, what I claim as new and desire to secure by Letters Patent is:—

1. In a coupling for fish tapes, the combination with a coupling member provided with a head having backwardly inclined arms, of a female coupling member having a cavity larger than the head and provided with an opening leading to the cavity which is just large enough to permit the head to be inserted therein, the inner end of said opening terminating in an inwardly-directed annular lip or flange.

2. A coupling for fish tapes, comprising a male coupling of spheroidal shape provided with a head extending from its end which presents two backwardly-inclined arms, of a female coupling member also of spheroidal shape, said female member having a cavity larger than the head, and an opening in its end leading to the cavity which is of a diameter substantially equal to the distance between the tips of said arms, said coupling member also having an inwardly-directed annular flange at the inner terminal of said opening.

3. A coupling for fish tapes, comprising a male coupling of spheroidal shape provided with a head extending from its end which presents two backwardly-inclined arms, of a female coupling member also of spheroidal shape, said female member having a cavity larger than the head and an opening in its end leading to the cavity which is of a diameter substantially equal to the distance between the tips of said arms, said coupling member also having an inwardly-directed annular flange at the inner terminal of said opening, and a fish tape secured to said member and occupying a plane at right angles to that of the arms of the head.

4. A coupling for fish tapes, comprising a male coupling of spheroidal shape provided with a head extending from its end which presents two backwardly-inclined arms, of a female coupling member also of spheroidal shape, said female member having a cavity larger than the head, and an opening in its end leading to the cavity which is of a diameter substantially equal to the distance between the tips of said arms, said coupling member also having an inwardly-directed annular flange at the inner terminal of said opening, each coupling member also having a neck provided with an axial recess in which the folded end of a fish tape section is received, the end of said neck being swaged to partially close said recess.

In testimony whereof, I have signed my name to this specification, in the presence of two subscribing witnesses.

FREDERICK A. SWAN.

Witnesses:
Louis C. Smith,
Bertha F. Heuser.